United States Patent [19]

Williams

[11] Patent Number: 4,747,436
[45] Date of Patent: May 31, 1988

[54] TIRE WITH IMPROVED BEAD REGION

[75] Inventor: Arthur R. Williams, Solihull, England

[73] Assignee: SP Tires UK Limited, Birmingham, England

[21] Appl. No.: 834,353

[22] Filed: Feb. 28, 1986

[30] Foreign Application Priority Data

Mar. 2, 1985 [GB] United Kingdom ............... 8505424

[51] Int. Cl.$^4$ .................. B60C 15/06; B60C 11/04; B60C 13/02
[52] U.S. Cl. .................. 152/209 R; 29/450; 40/587; 116/200; 152/523; 152/541; 152/543; 152/546; 152/560
[58] Field of Search ............ 152/450, 524, 543, 454, 152/209 R, 209 D, 523, 526, 541, 546, 548, 560; 116/200; 40/587; 29/450; D12/137

[56] References Cited

U.S. PATENT DOCUMENTS

| | | | |
|---|---|---|---|
| 999,157 | 7/1911 | Eckrode | 152/548 X |
| 3,155,135 | 11/1964 | Klenk | 152/209 R |
| 3,421,566 | 1/1969 | Sidles et al. | 152/523 X |
| 3,909,906 | 10/1975 | MacMillan | 152/523 X |
| 4,265,292 | 5/1981 | Inoue | 152/546 |
| 4,700,762 | 10/1987 | Landers | 152/209 R |

FOREIGN PATENT DOCUMENTS 0205203 12/1982 Japan .................. 152/210

Primary Examiner—Donald E. Czaja
Assistant Examiner—Thomas Bokan
Attorney, Agent, or Firm—Birch, Stewart, Kolasch & Birch

[57] ABSTRACT

A tire having a pair of axially spaced-apart bead regions each reinforced by an annular bead hoop around which one edge of a carcass reinforcing ply is wrapped and a filler strip positioned in the axially outer region of the bead. The filter strip which extends circumferentially around the bead, has one edge radially inwards of the bead hoop and one edge axially outwards of the bead hoop characterized in that the filler strips in both beads have their cords laid at an angle to the same specified direction circumferentially such that the cords of one filler strip are substantially parallel to the cords of the other filler strip. The tire has an external direction marker in the same circumferential direction to the specified direction so that in use the tire may be fitted to a vehicle with the marker in the opposite direction to the greatest torque force from the wheel. The filler strip may be cut edge tire cord fabric or a single cord laid in a zig-zag to form the fabric.

9 Claims, 1 Drawing Sheet

TIRE WITH IMPROVED BEAD REGION

BACKGROUND OF THE INVENTION

The present invention relates to tires with improved bead regions and in particular to heavy duty tires such as are used for trucks and buses.

The tire of the present invention includes in the bead region a filler or chafer strip laid around the outside of the bead over the carcass ply or plies and extending from beneath the bead hoop to a point radially outwards of the bead hoop. This chafer strip is usually made of cut edged weftless tire cord fabric laid with the cords at an acute angle (bias angle) to the centerline of the bead hoop.

In use of the vehicle cyclically varying tensile and compression forces are applied to the radially outer edge of the filler strip and tire life can be reduced by failure in the edge region of the filler strip known as filler edge looseness. This failure is a a failure of the bond between the cords at their ends and the rubber compound of the tire can result in a complete tire failure.

It has been suggested in UK Patent Specification No. 2141676 A to use looped edge fabric to avoid the cut edges of the cords and reduce this problem by improving the resistance of the cord at the filler strip edges to filament separation.

It is an object of the present invention to reduce the filler edge looseness problem by a different approach and to provide a construction which materially reduces the failure inducing forces in the filler strip.

The present invention provides a tire having a pair of axially spaced-apart bead regions each reinforced by an annular bead hoop around which one edge of a carcass reinforcing ply is wrapped and a filler strip positioned in the axially outer region of the bead which extends circumferentially around the bead. The filler strip has one edge radially inwards of the bead hoop and one edge axially outwards of the bead hoop and comprises substantially weftless tire cord fabric laid with the cords at an acute angle to the circumferential centerline of the bead hoop wherein the filler strips in both beads have their cords laid at an acute angle to the same specified direction circumferentially such that the cords of one filler strip are substantially parallel to the cords of the other filler strip. The tire has an external direction marker in the same circumferential direction to the specified direction so that in use the tire may be fitted to a vehicle with the marker in the opposite direction to the greatest torque force applied to the tire from the wheel.

In the case of a non-driven wheel, the greatest torque force from the wheel is the torque from the brakes and in the case of a driven wheel the greatest torque force leading to tire failure is that due to the drive torque, although the braking force sometimes is the larger torque being applied of a short duration.

The filler strip may have its radially inner edge beneath the bead hoop or may be alongside it in the heel region of the tire. The radially outer edge of the filler strip is preferably radially outwards of the edge of the carcass ply so that the filler strip overlies the said edge. The radially outer edge of the filler strip may be a folded edge with the filler strip folded back on itself.

The filler strip may comprise cut edge tire fabric or may comprise a narrow band formed by a single cord which extends back and forth across the band in a zigzag formation to form a band substantially of a single cord in thickness.

The assembly is such that the range of stress applied to the filler strips at their radially outer edges are reduced because the predominant large torque forces what would otherwise lead to filler edge looseness are applied to the filler strip in predetermined directions so that the cords act in the most efficient manner.

More then one filler strip may be used at each side of the tire and any known filler strip material including steel cords may be utilized.

Hitherto, while cords have been placed in the same directions at both sides of the tire it has been without the important tire marker to provide correct usage and such matched directions have been purely to ease production problems such as rolling down of components during tire assembly. The marker on the tire may be on the sidewall or a directional tire tread pattern.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

Figure 1:
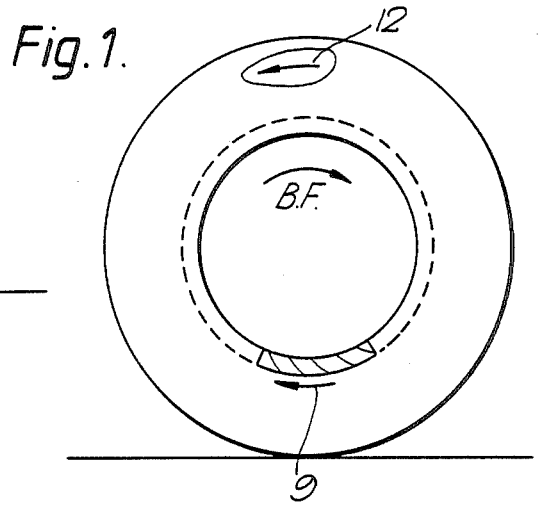
FIG. 1 is a scale view of a tire on a non-driven wheel of a vehicle with the chafer strip fabric partially exposed.
Figure 2:
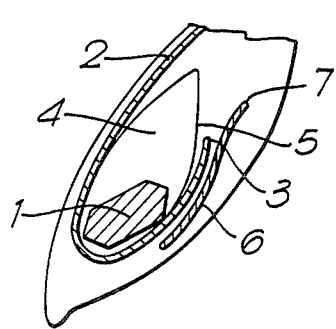
FIG. 2 is a cross section of a single tire bead with one type of filler strip construction.

The tire shown in FIG. 1 is a conventional radial carcass truck tire having at each side of the tire a tire bead region for engagement with a wheel rim and through which is transmitted drive and braking forces. The tire bead is shown enlarged and in cross section in FIG. 2 and comprises a steel wire reinforcement hoop 1 around which is wrapped a tire carcass reinforcement ply 2. A hard rubber apex strip 4 projects radially outwards from the hoop 1 and provides an outer surface 5 to support the radially outer edge 3 of the carcass ply 2. A bead filler strip 6 is positioned axially outwards of the bead hoop 1 and extends as shown from adjacent the base of the hoop 1 to a point 7 beyond the carcass ply edge 3. The construction thus far is entirely conventional and the remainder of the tire with a tread zone and tread reinforcing breaker is also conventional and not part of the present invention.

Figure 4:
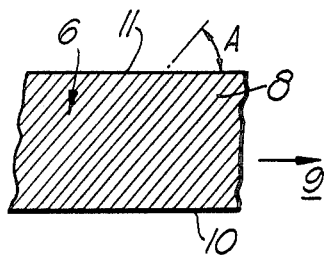
FIG. 4 is a plan of one filler strip fabric.

The filler strip 6, as shown in FIG. 4 comprises a weftless tire cord fabric strip with the individual parallel cords 8 all at an acute angle A to a direction 9. The cords are cut at each edge 10 and 11 of the strip. The filler strip is assembled into the tire beads taking care that for both beads of the tire, the direction 9 for the filler strips point in the same circumferential direction around the tire. Thus the two filler strips, one at either side of the tire are arranged so that their cords are mutually parallel when viewed from one side of the tire such as in FIG. 1.

The tire assembly is then marked temporarily and when the tire is cured in a mold the mold includes an arrow cavity which is positioned so as to form on the sidewall an arrow 12 pointing in the specified direction which is opposite to direction 9. (See FIG. 1.) Thus the completed tire has an outer marker 12 which is predetermined by the direction of the matched filler strips in both beads.

The tire may then be fitted to a vehicle such that the predominant torque force is in the opposite direction of the marker. The example of FIG. 1 is for a non-driven wheel where the greatest torque force is the braking force B.F. In the case of a drive wheel, the tire is assembled so as to run the same way and thus in both cases the filler strip between is oriented in a predetermined direction to give best filler edge durability.

Figure 5:
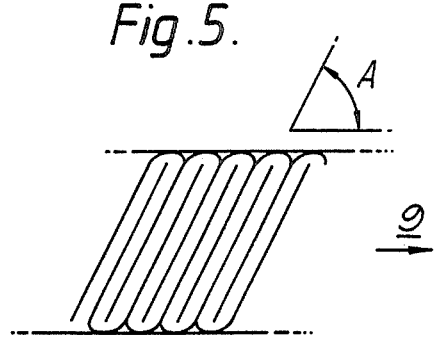
FIG. 5 is an alternative fabric to FIG. 4.

An alternative filler strip fabric construction is shown in FIG. 5 where a single tire cord is laid in a zig-zag formation to form a non-cut edge fabric. Once again the specified direction 9 is as shown.

Figure 3:
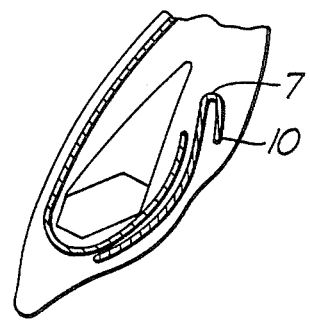
FIG. 3 is a cross section of an alternative filler strip construction to FIG. 2.

FIG. 3 shows a bead construction where the radially outer edge 7 of the filler strip is formed by a fold in the strip and a short overlap region 10 leads to the cut ends of the cords.

Other fabric constructions may be utilized as long as they are substantially weftless so that the cords may be laid in the preferred direction in all cases.

Finally the tire marker may be of other forms including a directional tread pattern for example V-shaped pattern for use in wet conditions.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Having now described my invention what I claim is:
1. A tire to be mounted onto a wheel of a vehicle during use, said tire comprising:
   a pair of axially spaced-apart bead regions each reinforced by an annular bead hoop with a carcass reinforcing ply wrapped around one edge of said annular bead hoop;
   a pair of filler strips one of each filler strips disposed within an axially outer portion of each said bead region, each of said filler strips extending circumferentially around each bead region, and positioned axially outwardly relative to said annular bead hoop;
   each of said filler strips comprising a substantially weftless tire cord fabric having cords, said cords are positioned at an acute angle with respect to a circumferential centerline of said annular bead hoop in a circumferential direction of greatest torque force to be applied to the tire from the wheel;
   each filler strip in each bead region having its cords oriented at substantially the same angle with respect to a predetermined tire circumferential direction so that said cords of one filler strip in one bead region are substantially parallel to said cords of the other filler strip in the other bead region; and
   direction indicating means for enabling mounting of said tire on the wheel of a vehicle so that said cords are positioned at an acute angle with respect to the direction of greatest torque force to be applied to the tire from the wheel.

2. The tire according to claim 1, wherein each said filler strip has an edge extending substantially radially inwardly is disposed beneath the bead hoop.

3. The tire according to claim 1, wherein each said filler strip has an edge extending substantially radially inwardly is disposed in a heel region of said tire.

4. The tire according to claim 1, wherein an edge extending substantially axially outwardly of each said filler strip is disposed radially outwardly of a ply edge of said carcass reinforcing ply so that said filler strip overlies said ply edge.

5. The tire according to claim 1, wherein each said filler strip comprises a cut edge tire fabric.

6. The tire according to claim 1, wherein each said filler strip comprises a narrow band formed by a single cord which extends back and forth across said narrow band in a zig-zag formation to form a band substantially one cord in thickness.

7. The tire according to claim 1, wherein said direction indicating means comprises a marker molded on an outer surface of said tire.

8. The tire according to claim 7, wherein said marker is an arrow pointing in a circumferential direction that is opposite to said tire circumferential direction defined by the circumferential direction in which said cords, extending from an outer periphery to an inner periphery of said filler strip, extend in a circumferential direction of said tire.

9. The tire according to claim 1, wherein said edge of said filler strip extending substantially axially outwardly includes a folded edge with said filler strip folded back on itself.

* * * * *